Patented June 3, 1952

2,599,250

UNITED STATES PATENT OFFICE 2,599,250

PRODUCTION OF HALOPHENOXY ACETIC ACIDS

Victor C. Fusco, Youngstown, N. Y., assignor to Mathieson Chemical Corporation, New York, N. Y., a corporation of Virginia No Drawing. Application September 9, 1949, Serial No. 114,933

4 Claims. (Cl. 260—521)

My invention relates to the production of alkali metal salts of halophenoxy acetic acids which are substantially pure and from which the free acids and their derivatives may be readily prepared.

Two commercially important herbicides are 2,4-dichlorophenoxyacetic acid and 2,4,5-trichlorophenoxyacetic acid, their salts and esters. Usually these materials are made by condensing an aqueous solution of the sodium salt of the appropriate halophenol and sodium chloroacetate. In carrying out the condensation reaction it is conventional to prepare relatively concentrated aqueous solutions of the sodium phenolate and sodium chloroacetate, to admix these solutions and evaporate the mixture to substantial dryness. Usually the reaction proceeds very rapidly, and most of the reaction occurs within a few minutes. It is advantageous, however, to remove the water, for example, by controlled heating so as to avoid local overheating and decomposition, for improvement in yield is obtained by forcing the reaction to completion by removal of the water due to the increased concentration of unreacted reagents.

After the condensation reaction, the mixture is usually acidified to convert the condensation product from its sodium salt to the free acid. At the same time excess sodium phenolate is converted to free phenol and the mixture of phenol and halophenoxy acid is separated from the water by filtration or extraction. In order to separate the unreacted phenol from the halophenoxy acid, it is customary to steam the mixture to distill out the excess phenol. It has also been suggested in British Patent No. 617,448 to pour the mixture of acid and excess phenol into a selective solvent for the phenol, for example, kerosene. Both of these expedients are expensive and complicate the process and equipment requirements.

I have discovered that polyhalophenoxy acetic acid alkali metal salts, e. g. the sodium salts of 2,4-dichlorophenoxyacetic acid and 2,4,5-trichlorophenoxyacetic acid, are almost insoluble in and are precipitated from alkali halide solutions having a concentration of from about 7 per cent up to saturation based on the halide and water in the mixture.

In accordance with my invention, I prepare a slurry of the dried mixture in an amount of water so limited that the sodium chloride, for example, formed by the condensation reaction will be present to the extent of 7 per cent or more. At the same time it is usually necessary to adjust the pH since a very small amount of hydrolysis, which usually occurs, will tend to acidify the mixture. For this purpose I add sufficient alkali to bring the pH to at least 10 and preferably in the range of 10–12. If too much water is added to the dried reaction mixture, and the sodium chloride concentration, based on the sodium chloride and water, drops below about 7 per cent, small amounts of sodium halophenoxyacetate will be dissolved in the water and will not be recovered, thus lowering the yield. The concentration of sodium chloride may be adjusted by the addition of further quantities of sodium chloride when too much water has initially been added. For this purpose, the sodium chloride may be added as solid salt or as a more concentrated solution than it is desired to produce. Under these conditions the sodium halophenoxyacetate is precipitated in a substantially pure condition. It may be advantageously filtered and washed with salt solution having a concentration of about 7 per cent or more up to saturation. A subsequent water wash may be desirable to remove sodium chloride in some instances though its presence is not always objectionable. If the organic sodium salt is subsequently to be converted to the acid or an ester, for example, the sodium chloride content is not objectionable. The solid organic sodium salt is dried by conventional means. It is substantially pure and free from unreacted phenol.

The filtrate from this separation contains substantially all of the excess sodium halophenolate from which the phenol may be recovered by acidification. It is suitable to recycle to the beginning of the process if a substantially pure phenol was used as the starting material. However, if a relatively impure phenol was used, some selectivity in the condensation reaction appears to result in the concentration of certain isomers of lower reactivity in the recovered phenols.

The sodium halophenoxyacetate, when filtered and dried, may be used as such as a herbicide, or it may be converted into the acid or further into esters for this and other purposes.

Although various sodium halo acetates may be used, sodium chloroacetate is quite reactive and for economic reasons is preferred. It is convenient to dissolve the halophenol in the calculated amount of aqueous caustic alkali and to convert the chloroacetic acid to its sodium salt. Sodium hydroxide is preferred but potassium hydroxide or other alkali metal hydroxides may be used. Equimolecular proportions of the two sodium salts do not necessarily give the best yield of condensation product, and it is advantageous to use an excess of the halophenolate. The halophenols are relatively weak acids so that both their sodium salts and the reaction mixture will be alkaline. Use of an excess of sodium chloroacetate in this medium gives rise to considerable sodium hydroxyacetate by hydrolysis. The hydroxy acetate is not reactive under the conditions to produce the desired reaction product, and represents an economic loss. On the other hand, an excess of sodium halophenolate increases the yield and tends to reduce the hydrolysis of sodium chloroacetate to a considerable extent. The color of the product is also improved.

Other herbicidally active acids to which, in the form of their alkali metal salts, my invention may be applied, include 2-chlorophenoxyacetic acid, 4-chlorophenoxyacetic acid, 2,4,6-trichlorophenoxyacetic acid, 2,3,4,6-tetrachlorophenoxyacetic acid, pentachlorophenoxyacetic acid, 4-bromophenoxyacetic acid, 2,4-dibromophenoxyacetic acid, 2,4-difluorophenoxyacetic acid, 4-iodophenoxyacetic acid, 2 - methyl - 4 - chlorophenoxyacetic acid, 2-methoxy-4-chlorophenoxyacetic acid and chloronaphthoxyacetic acids.

The following examples are typical but not limiting preparations applying the principles of my invention. In the following examples, all parts are by weight.

*Example I*

The approximate minimum concentration of sodium chloride necessary for complete precipitation of sodium 2,4,5-trichlorophenoxyacetate from a typical reaction mixture according to the method of my invention is indicated in the following procedure. Twenty-three and six-tenths grams of chloroacetic acid was dissolved in water and neutralized by the careful addition of a solution of 10 grams of sodium hydroxide in 90 ml. of water, maintaining the temperature below 30° C. and on the acid side up to the neutral point. Then 74.1 grams of 2,4,5-trichlorophenol was dissolved in an aqueous caustic solution containing 15 grams of sodium hydroxide in water. The two neutralized solutions were combined and evaporated in an oven at 130° C. The resulting solids were slurried with about 1500 ml. of water and the aqueous portion then had a pH of 8 which was adjusted to 10 by the addition of caustic. The insoluble sodium 2,4,5-trichlorophenoxyacetate was filtered off, washed with 10% salt solution and dried. The filtrate, amounting to 1720 ml., contained 25.3 grams per liter of sodium chloride. The addition of 70 grams of sodium chloride to the filtrate precipitated an additional 8 grams of 2,4,5-trichlorophenoxyacetate, and the addition of 20 more grams of sodium chloride yielded only 0.8 gram of the organic salt. The final solution contained 7.78 per cent of sodium chloride.

*Example II*

Sixty-four and four-tenths grams of 2,4,5-trichlorophenol, 23 grams of sodium hydroxide and 23.6 grams of chloroacetic acid were combined as described in Example I and heated at 130° for 3 hours after becoming apparently dry. Two liters of water were added and followed by sufficient sodium hydroxide to bring the pH to 10.5. The mixture was thoroughly agitated and the solid sodium 2,4,5-trichlorophenoxyacetate removed by filtration, washed with salt solution (about 10 per cent NaCl), then water, and dried. Trichlorophenol was recovered from the filtrate by acidification with hydrochloric acid.

An aqueous solution of 53 grams of the sodium 2,4,5-trichlorophenoxyacetate was acidified and the precipitated acid was filtered, washed and dried. About 42 grams of 2,4,5-trichlorophenoxyacetic acid was obtained, having a melting point of 154–155° C. and a neutralization equivalent of 255.3.

*Example III*

A solution of 377 grams of 95 per cent 2,4-dichlorophenol and 96 grams of NaOH was prepared in 300 ml. of water. A solution of sodium chloroacetate was prepared by neutralizing 189 grams of chloroacetic acid with 80 grams of sodium hydroxide in 300 ml. of water. The solutions were mixed and heated to boiling. Coagulation began in 6.5 minutes. The slurry was poured into pans and baked for 3 hours at 130° C. The cake was then slurried in 2000 ml. of hot distilled water, sodium hydroxide was added to bring the pH to 10. On heating to boiling all the material dissolved and on cooling the sodium salt of 2,4-dichlorophenoxyacetic acid separated and was filtered and washed with 7 per cent NaCl solution. The addition of 100 grams of NaCl to the filtrate produced no further precipitate indicating that all the sodium salt of the organic acid was precipitated by the NaCl resulting from the reaction.

*Example IV*

Following the same procedure as in the preceding example, a solution was prepared of 172 grams of 95 per cent dichlorophenol and 48 grams of NaOH in 200 ml. of water and a solution of 94.5 grams of chloroacetic acid and 40 grams of NaOH in 100 ml. of water. The solutions were mixed, brought to boiling and the pH adjusted to 10. After baking 3 hours at 130° C., the cake was dissolved in 1000 ml. of water at the boiling point. On cooling the sodium 2,4-dichlorophenoxyacetate separated and was filtered off, washed with 10 per cent NaCl solution and dried. No further salt was precipitated by the addition of 100 grams of NaCl to the filtrate.

An aqueous solution of 173 grams of the sodium 2,4-dichlorophenoxyacetate was acidified with concentrated hydrochloric acid. The organic acid was filtered, washed and dried to yield 151 grams having a melting point of 139–141° C. and a neutralization equivalent of 219.8.

*Example V*

A solution was prepared from 64.4 grams of 2,4,5-trichlorophenol, 13 grams of NaOH, and 100 ml. of water, and another from 23.6 grams of chloroacetic acid, 10 grams of NaOH and 130 ml. of water. The solutions were mixed and heated at 130° C. overnight. The resulting cake was dissolved in 200 ml. of boiling water, pH adjusted to 10.5, cooled and filtered. Addition of 20 grams of solid NaCl to the filtrate gave no further precipitate. The solid was washed three times with 7.5 per cent NaCl solution and dried at 110° C. The 81 grams of dried solid contained 15.65 per cent NaCl and 84.35 per cent sodium 2,4,5-trichlorophenoxyacetate. The 68.3 grams of the latter represents a yield of 98.5%.

*Example VI*

Fifty-four and five-tenths grams of 2,4-dichlorophenol and 32.2 grams of potassium hydroxide were dissolved in 56.2 grams of water. A second solution was prepared of 23.6 grams of chloroacetic acid and 18.5 grams of water, and the solutions were combined, heated for ten minutes and baked for two hours at 120–130° C. The cake was dissolved in 75 ml. of boiling water, the pH adjusted to 11 by the addition of caustic and cooled. An excellent yield of potassium 2,4-dichlorophenoxyacetate was obtained by filtration.

I claim:

1. In the production of halophenoxyacetic acids by acidification of the condensation products of alkali metal halophenolates and haloacetates, the steps of precipitating and recovering the alkali metal salt of the halophenoxyacetic acid from an aqueous slurry of the reaction mixture of the alkali metal halophenolate in substantial excess of the theoretical amount required to react with the alkali metal haloacetate prior to acidification by adjusting the concentration of free metal halide in the mixture to a value of at least about 7 weight per cent based on the water and halide at a pH of at least about 10, by filtering the precipitated alkali metal halophenoxyacetate from the reaction mixture and by washing the precipitate with an aqueous solution of the alkali metal halide having an alkali metal concentration of at least 7 per cent by weight based on the water and halide in the solution.

2. The process for producing alkali metal salts of halophenoxyacetic acids which comprises reacting an amount in substantial excess of that theoretically required of an alkali metal halophenolate with an alkali metal haloacetate in an aqueous medium, removing water from the reaction mixture, adjusting the concentration of alkali metal halide in an aqueous slurry of the reaction mixture to a value of at least about 7 weight per cent based on the water and the halide at a pH of at least about 10, filtering the precipitated alkali metal halophenolate, washing the precipitate with an aqueous solution of the alkali metal halide having an alkali metal halide concentration of at least 7 per cent by weight based on the water and halide in the solution, and recovering the precipitated halophenoxyacetic acid salt.

3. The process of claim 2 in which the alkali metal halophenolate is sodium 2,4-dichlorophenolate.

4. The process of claim 2 in which the alkali metal halophenolate is sodium 2,4,5-trichlorophenolate.

VICTOR C. FUSCO.

REFERENCES CITED

The following references are of record in the file of this patent:

UNITED STATES PATENTS

| Number | Name | Date |
|---|---|---|
| 2,485,146 | Foster | Oct. 18, 1949 |
| 2,493,126 | Foster et al. | Jan. 3, 1950 |
| 2,516,611 | Berhenke et al. | July 25, 1950 |

FOREIGN PATENTS

| Number | Country | Date |
|---|---|---|
| 573,476 | Great Britain | Nov. 22, 1945 |
| 573,478 | Great Britain | Nov. 22, 1945 |
| 573,479 | Great Britain | Nov. 22, 1945 |
| 573,510 | Great Britain | Nov. 23, 1945 |

OTHER REFERENCES

MacArdle, "Solvents in Synthetic Org. Chem." (Van Nostrand), pp. 158–165 (1925).

Pokorny, J. Am. Chem. Soc., vol. 63, p. 1768 (1941).